US009125535B2

(12) United States Patent
Witter et al.

(10) Patent No.: US 9,125,535 B2
(45) Date of Patent: Sep. 8, 2015

(54) PULSE FILTER CLEANER FOR PORTABLE CYCLONIC DUST COLLECTOR/VACUUM CLEANER

(71) Applicants: Robert M. Witter, Englewood, FL (US); Jeffrey Hill, Cicero, NY (US); John J. Fitzsimmons, Clay, NY (US)

(72) Inventors: Robert M. Witter, Englewood, FL (US); Jeffrey Hill, Cicero, NY (US); John J. Fitzsimmons, Clay, NY (US)

(73) Assignee: ONEIDA AIR SYSTEMS, INC., Syracuse, NY (US)

( * ) Notice: Subject to any disclaimer, the term of this patent is extended or adjusted under 35 U.S.C. 154(b) by 390 days.

(21) Appl. No.: 13/765,276

(22) Filed: Feb. 12, 2013

(65) Prior Publication Data
US 2014/0223690 A1 Aug. 14, 2014

Related U.S. Application Data (63) Continuation-in-part of application No. 12/607,122, filed on Oct. 28, 2009, now Pat. No. 8,393,050, and a continuation-in-part of application No. 13/029,243, filed on Feb. 17, 2011, now Pat. No. 8,496,719.

(60) Provisional application No. 61/306,056, filed on Feb. 19, 2010, provisional application No. 61/315,695, filed on Mar. 19, 2010.

(51) Int. Cl.
| | |
|---|---|
| *A47L 9/10* | (2006.01) |
| *A47L 9/20* | (2006.01) |
| *B01D 46/04* | (2006.01) |
| *B01D 46/00* | (2006.01) |
| *A47L 9/16* | (2006.01) |
| *B04C 9/00* | (2006.01) |

(52) U.S. Cl.
CPC ................ *A47L 9/1666* (2013.01); *A47L 9/20* (2013.01); *B01D 46/0068* (2013.01); *B01D 46/0093* (2013.01); *B04C 2009/002* (2013.01)

(58) Field of Classification Search
CPC ... B01D 46/0068; B01D 46/0093; A47L 9/20
USPC .............................. 15/353, 352; 55/302, 337
See application file for complete search history.

(56) References Cited

U.S. PATENT DOCUMENTS

| | | | |
|---|---|---|---|
| 8,393,050 B2 * | 3/2013 | Witter | 15/353 |
| 8,496,719 B2 * | 7/2013 | Witter | 55/337 |

* cited by examiner

*Primary Examiner* — Bryan R Muller
(74) *Attorney, Agent, or Firm* — Bernard P. Molldrem, Jr.

(57) ABSTRACT

A cyclonic portable vacuum cleaner/dust collector has a cyclonic chamber and a filter chamber. The filter chamber contains a filter cartridge with a hollow core positioned over the discharge opening of a motor plate that closes the filter chamber. A vacuum blower is mounted on the motor plate, with an intake tube at the discharge opening of the motor plate. An annular pulse-cleaning plate is positioned over an associated annular opening that surrounds the motor plate discharge opening and has an open center that slides up and down on the intake tube of the vacuum blower. A bail handle or lever extends from the pulse-cleaning plate to a handle portion outside the cover or shroud. The handle is pushed down to lift the pulsing plate to provide a reverse pressure air pulse to the filter to blast off accumulated dust. An anti-deflagration screen may be present at the center of the motor plate.

9 Claims, 5 Drawing Sheets

PULSE FILTER CLEANER FOR PORTABLE CYCLONIC DUST COLLECTOR/VACUUM CLEANER

This is a continuation-in-part of pending application Ser. No. 12/607,122, filed Oct. 28, 2009, and of pending application Ser. No. 13/029,243, filed Feb. 11, 2011, which claims priority under 35 USC 119(e) of provisional patent application Ser. No. 61/306,056, filed Feb. 19, 2010 and Ser. No. 61/315,695, filed Mar. 19, 2010. The disclosures of these are incorporated by reference herein.

BACKGROUND OF THE INVENTION

This invention may be embodied in heavy-duty vacuum cleaners of the type intended for workshop use, such as in wood shops, machine shops, or for industrial applications, namely, a hybrid shop vacuum/dust collector, having a higher capacity (more CFM) than a standard shop vacuum. The invention is more particularly concerned with an improvement in a heavy duty portable vacuum in which there are a two or more dust separation stages, with the large majority of the dust being separated cyclonically and deposited into a drum or barrel, and with the remaining dust that is carried in the vacuum machine air stream being filtered out in a final filter, so that the vacuum cleaner machine exhausts clean, filtered air into the ambient. A vacuum fan or blower in the unit pulls the air stream through the final filter and exhausts it as filtered air into the ambient.

Industrial vacuum cleaners and shop vacuum cleaners are often employed for picking up dust that has accumulated on the shop floor and on surfaces of equipment, or may also be connected to a dust outlet of a dust-producing tool, i.e., wood working machines, such as sanders, joiners, and the like, or machines that process metals, plastics, or other composites such as concrete or stone. In these industrial vacuum devices, there is typically a vacuum head and a drum or barrel. The vacuum head has a blower that is powered by an electric motor to induce suction to draw a stream of air into the machine. The airstream is then directed into the barrel, where dust collects. From there, the air stream passes though a bag filter or other filter, and is exhausted to the ambient.

In most cases, the vacuum filter does not filter out fine dust, and there is always at least some of the dust that passes out and back into the ambient air. This airborne fine dust can present a health hazard, and in a wood shop environment airborne particulates constitute a serious quality issue as the airborne dust can contaminate varnish or other wood finishes.

The dust that is collected can quickly clog and blind the filter also, which limits air flow and diminishes the efficiency of the vacuum cleaner. Moreover, filling of the filter material requires that the vacuuming operation be interrupted frequently fto clean and/or replace the filter.

A shop-type vacuum cleaner with a cartridge type final filter to capture fine dust particles has been proposed previously, and an example of such a shop vacuum is described in U.S. Pat. No. 5,069,696. In that case, an externally-mounted filter is located in the exhaust air stream in a housing that is disposed outside the vacuum machine drum or canister. This arrangement exhausts significantly cleaner air back into the ambient, but because the air passes directly from the main collection drum out to the filter housing, the filter accumulates dust quickly and requires frequent cleaning for effective operation.

It has been proposed previously to employ a cyclonic separator in line in a vacuum hose in advance of a shop vacuum cleaner for pre-separating particulate matter, and then with the outlet pipe of the cyclonic separator connecting to the inlet of the vacuum cleaner. This arrangement is described, for example, in U.S. Pat. No. 7,282,074. This system can result in removal of about ninety percent, or more, of the dust from the air stream ahead of the vacuum cleaner, so that the vacuum cleaner operates longer and more efficiently in most applications. However, this arrangement requires attaching the cyclone as a separate element in between the shop vacuum cleaner and the dust producing tool or dust pick-up tool.

The portable vacuum and dust collector can be used in cabinetmaking, carpentry and similar trades, in which a flammable process dust is directed to a dust storage drum and in which the air that is separated from the dust is returned to the ambient. In equipment of this type is advantageous that the dust separator vacuum cleaner incorporate a feature for creating a reverse air pulse that passes through the filter media to blast off dust that has begun to accumulate on the filter media.

A flame arrester, deflagration arrester, or flame trap may also be incorporated into the equipment to stop the propagation of a deflagration traveling along the air flow path and extinguishing the flame front.

OBJECTS AND SUMMARY OF THE INVENTION

Accordingly, it is an object of this invention to create a combined vacuum and a high energy efficiency cyclonic separator so that the device has an efficient but simplified design, and which incorporates a reverse pulse mechanism for cleaning the filter cartridge, but does not impare or complicate the normal operation of the device.

It is a more specific object to provide a reverse pulse mechanism that operates by action of a simple lever, and which returns to a mode for normal operation as soon as the lever is released, in which the vacuum cleaner efficiently removes nearly all of the dust from the vacuum air stream, returning clean, filtered air to the ambient, without danger of igniting airborne dust in the ambient.

It is a further object of this invention to provide a vacuum cleaner which can operate for an extended period without need to unclog or clean the exhaust air final filter.

An important object is to provide a powerful and heavy-duty vacuum cleaning machine that is light-weight and portable, can operate safely in an environment that contains significant levels of process dust, and can be easily wheeled into place.

Another object is to provide a vacuum cleaner having a pulse cleaning feature that allows the user to produce a reverse pulse of air flow to drive dust off the final filter buy does not impede the operation of a conflagration suppressor.

According to an aspect of the invention, a heavy duty portable vacuum cleaner has a conic body that is generally defined by a conic wall or shell. A top plate closes off a wide upper end of the conic wall, and a narrow nose, situated at a lower end of the conic wall, serves as dust outlet. In one embodiment, the top plate has a central air passage. A second plate or disc is affixed within the conic body at a level that is about midway between the lower end and the upper end of the conic body. This second plate serves as the upper wall of a cyclonic chamber between the second plate and the nose of the conic body. The second plate also serves as the lower wall of a filter chamber above the divider plate, i.e., between the second plate and the top plate. The second plate can have a shallow conic shape, i.e., concave shape sloping towards a central passage, with a vortex tube descending from the central passage into the cyclonic chamber. The cyclone second plate is adapted to return dust pulsed from the filter down to the dust collection drum.

An air inlet conduit penetrates the conic wall just below the second plate and is adapted to introduce into the cyclonic chamber a flow of air in which dust particles are entrained. The air inlet conduit is adapted to attach to a flexible vacuum hose, with the hose being connected to a dust pickup tool, or to dust generating equipment such as a saw, joiner, sander, etc.

A dust collection drum, i.e., a barrel or canister, is positioned below the nose of the conic body, and has a lid that closes off the top or mouth of the dust collection drum. The lid has a dust inlet opening. A boot, collar, or flange couples the nose of the conic body with the inlet opening of the lid. Dust that is separated in the cyclonic chamber from the air flow drops from the nose, through the inlet opening, into the dust collection drum. There should be a generally air-tight dust seal with both the nose and the lid to preclude leakage of external air into the cyclonic chamber and/or into the drum.

A final filter, e.g., a generally cylindrical cartridge filter, which may be a HEPA filter, is mounted on the lower side of the upper plate, at the center so as to cover the air passage. The filter is thus suspended within the filter chamber, and is adapted to filter the air that leaves the vortex tube and enters the filter chamber from the central passage of the second plate. This air is filtered before the air leaves through the central air passage of the upper plate. The final filter cartridge is sealably disposed against an under side of the top plate and surrounds the air passage.

A vacuum blower is supported upon the upper plate. The blower has an inlet opening that communicates with the central air passage in the upper plate. Favorably, the blower is covered with a somewhat cylindrical shroud, which may have a lining of a sound absorptive material. This material may be porous to air, at least at the top, to permit the air to exhaust without much resistance to the ambient. To facilitate portability, the machine has a wheeled carriage, e.g., with wheels or casters at the base of the dust collection drum. Alternatively, the unit may be wall-mounted, using a suitable wall bracket.

Favorably, there may be a mounting ring disposed at the top end of the conic body affixed just inside the upper rim, i.e., at an inner periphery of the wide upper end of the conic wall, with the top plate resting atop the mounting ring. An annular gasket or similar seal or gland is disposed between the mounting ring and a periphery of the upper plate.

A series of clamps are disposed around the periphery of the wide upper end of the conic wall for releasably clamping the top plate against the mounting ring with the gasket compressed between them. The clamps can release the top plate (here serving as a motor plate), which can be lifted out to change the filter cartridge, when needed.

The vacuum blower is mounted with its rotary axis vertical, and with its inlet conduit disposed on the rotary axis and also positioned on the machine axis. The inlet conduit of the vacuum blower is placed into or against the air passage of the top plate, to draw air from the filter chamber and exhaust it to the ambient. In this case, the air in the filter chamber passes from the radially outer side of the filter, through the medium, into the open core of the filter, and out through the air passage in the top plate and through the vacuum blower.

The top cover or shroud encloses the vacuum blower, and has a number of vent openings to permit exhaust air from the blower to escape to the ambient.

In some embodiments, a releasable plug, flap or plate member is seated against an opening in the top plate, near its central air passage. This can be unseated by pulling or pushing on a handle or lever outside the shroud. This feature is used to create a reverse air pulse to drive accumulated dust off the filter assembly. The dust then lands on the concave, funnel-shaped divider plate, and works its way down into the vortex tube, and continues down into the dust collection drum.

In practice, the dust collection drum receives the vast majority of the dust (typically, 99%+) from the vacuum cleaner air stream. The filter cartridge only deals with the very fine dust that is not separated out in the cyclonic chamber.

In operation, an air stream containing entrained dust passes from a flexible intake hose and through the intake conduit into the cyclonic separator that is formed at the lower part of the conic body; the vast majority of the dust is separated out here and drops into the dust collection drum. Then, the air stream exits upwards through the vortex tube into the filter chamber just above it in the upper part of the conic body. The majority of the remaining fine dust particles are caught in the final filter cartridge. The air flow continues in a radially inward direction through the final filter cartridge (HEPA) and from there through the central air passage of the top plate, into the intake duct of the vacuum blower. The vacuum blower exhausts clean, filtered air into the ambient.

The dust collection drum can include a hold-down feature for securing a flexible film bag liner within the drum. Such a hold-down feature can include a vacuum conduit penetrating a lower portion of the drum.

The vacuum cleaner arrangement of this invention can operate continuously for long periods without interruption, as 95 to 99+ percent of the collected dust is separated out by the cyclonic separator portion and is deposited into the dust collection drum. The machine of this invention has an advantage of increased fire safety, as the collected dust, which may present a danger of flame or explosion, is blocked from re-entering the ambient air. Industrial hygiene is vastly improved, as well, as dust and particulates (which may be toxic or carcinogenic) are kept out of the breathing air.

In order to reduce the risk of conflagration or explosion as much as possible, an anti-deflagration screen is employed in the process air stream, following the final filter, i.e., after the air passed through the filter cartridge.

The above and many other objects, features, and advantages of this invention will become apparent from the ensuing detailed description of one preferred embodiment, which is illustrated in the accompanying Drawing.

DETAILED DESCRIPTION OF A PREFERRED EMBODIMENT

Figure 1:
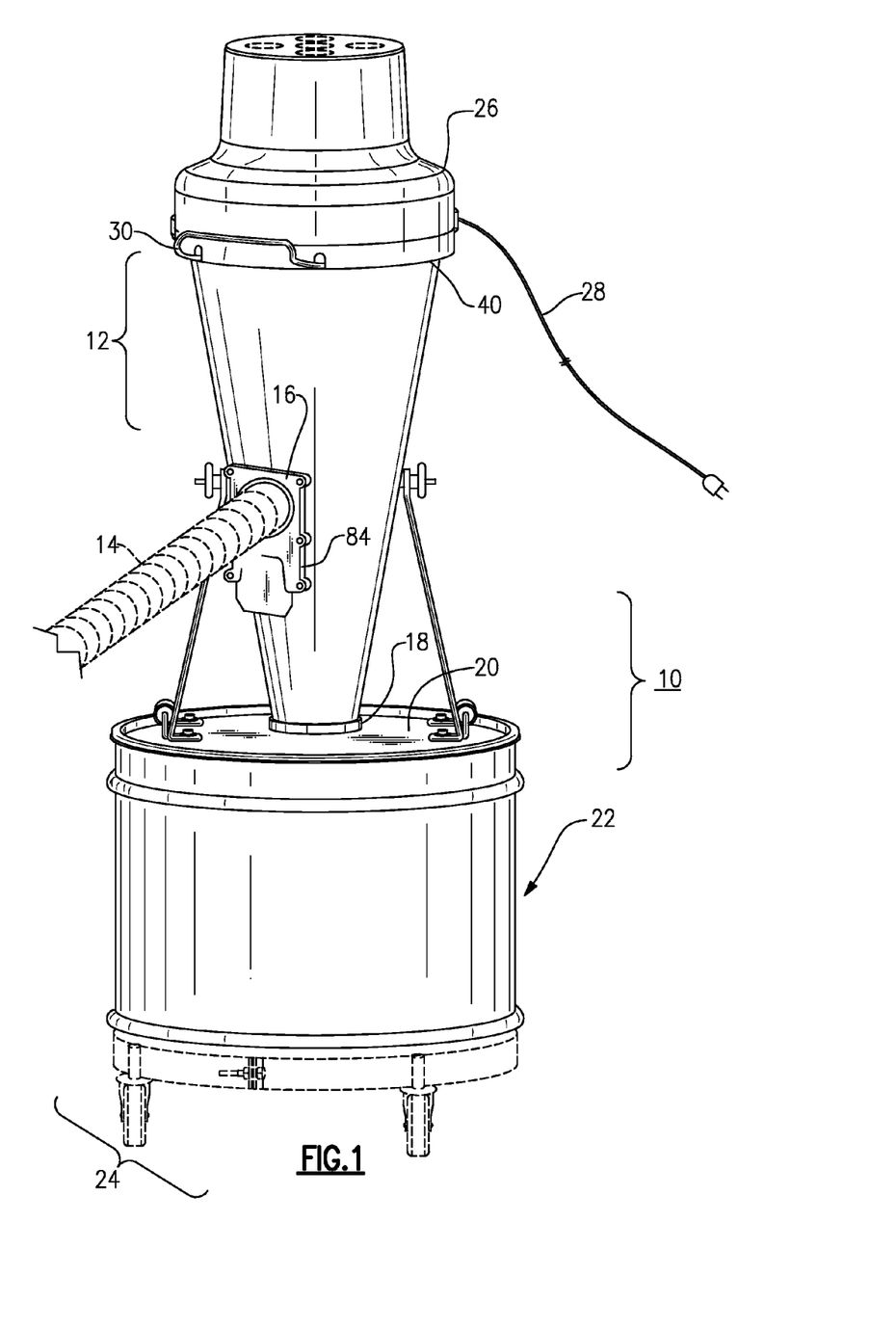
FIG. 1 is a perspective system view of a portable cyclonic vacuum cleaner device according to one embodiment of this invention.
Figure 2:
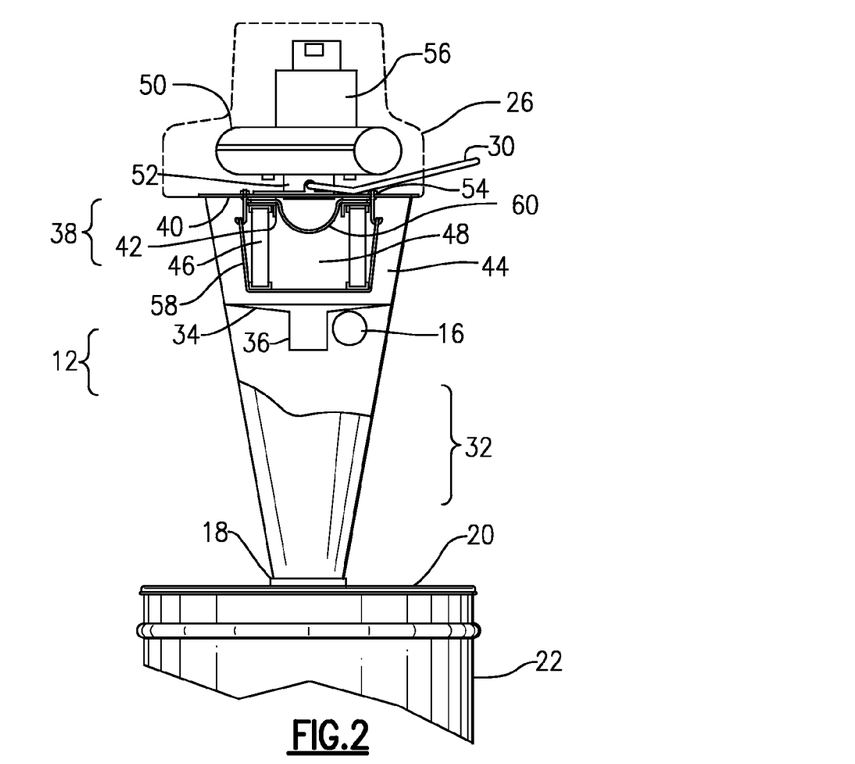
FIG. 2 is a cross sectional elevation thereof, with an upper shroud thereof shown in broken line.

Now, with reference to the Drawing, and initially to FIGS. 1 and 2, a portable cyclonic vacuum cleaner 10 according to an embodiment of this invention gathers and separates dust cyclonically from the air flow in which the dust is entrained, with the leaving air being cleaned in a final filter and returned to the ambient as clean, filtered air.

The cyclonic vacuum cleaner 10 is based on conic body 12, that is, a cone-shaped shell with a mouth or wide end at its top and a narrow nose at its bottom end. A vacuum hose 14 is attached onto an intake pipe 16 or air inlet penetrates the conic body 12 at a point about half-way between the mouth and the nose. The hose 14 can be connected to a scoop or other vacuum cleaner tool, or may be connected to a dust producing tool or appliance, such as a sander or saw. In this embodiment, the hose 14 and intake pipe 16 have a nominal 2.5 inch diameter. The intake pipe or inlet 16 can be shouldered and tapered to allow it to accommodate a wide range of standard hose diameters. Also shown in FIG. 1 is an optional gate valve 84 situated in the intake pipe 16. This is normally open, but can be closed off temporarily to block the intake pipe for pulse cleaning, as will be discussed later.

A flange 18 at the lower nose of the conic body 12 is affixed to both the conic body and to the center of a drum lid 20, which is fitted onto the top of a dust barrel or drum 22. A carriage 24 here is shown as a plurality of wheels or casters mounted at the base of the drum 22.

At the top of the unit is a motor compartment, here covered with a shroud or cover 26. Also shown here are an AC power cord 28 and a dust cleaner pulsing handle 30, to be described in more detail later. Also, a motor plate 40 serves as an upper plate for the top end of the conic body 12 and also serves as the base of the motor compartment.

As shown schematically in FIG. 2, in this embodiment, the conic body is divided into a cyclonic chamber 32 (formed in the lower half of the conic body 12) and a filter chamber 38 (formed in the upper half). A separator plate 34 which is located just above the position of the intake pipe 16, defines the upper end or top of the cyclonic chamber 32, and the lower nose defines the lower end of the cyclonic chamber. A vortex tube 36 descends from the center of the separator plate 34 down a short distance along the axis of the conic body. The air flow entering the cyclonic chamber via the intake pipe 16 proceeds around the vortex tube 36, then spirals along the inside conic wall of the chamber to the nose, then proceeds upwards along the axis of the cyclonic chamber and out through the vortex tube into the filter chamber 38 positioned just above.

The separator plate 34 defines the lower wall of the filter chamber 38, and the motor plate 40, which is secured to the open top of the conic body 12, defines the upper wall of the chamber 38. There is a filter holder 42 centered on the axis of the conic body 12 on the underside of the motor plate 40, and positioned around an outlet opening in the motor plate. Here, the filter holder 42 is favorably in the form of a ring flange with a short cylindrical male portion that extends into a corresponding open end of a cartridge filter 44.

The filter 44 in this embodiment is in the form of a cylindrical cartridge filter, with a cylinder of filter media 46 surrounding an open core 48 or center at the axis of the filter 44. Here, the lower end of the filter, i.e., the end away from the motor plate, is a closed disk. All of the air that enters the filter chamber 38 through the vortex tube 36 from the cyclonic chamber 32, has to flow radially inwardly through the media 46 to the open core 48 of the filter 44, and then proceeds up and out through the outlet opening in the motor plate 40.

In this embodiment, the motor compartment between the motor plate 40 and the shroud 26 contains a blower vac unit 50, here a centrifugal air pump, which is oriented along the axis of the unit, and is mounted on the top side of the motor plate 40. An intake duct 52 of the blower vac extends downward into and through the outlet opening 54 in the motor plate. An AC induction motor 56 is positioned above the blower vac unit.

Also shown here is a retainer strap 58 for the filter cartridge 44 which passes under the filter cartridge and is secured by hooks to the motor plate on opposite sides of the filter holder 42.

Figure 3:
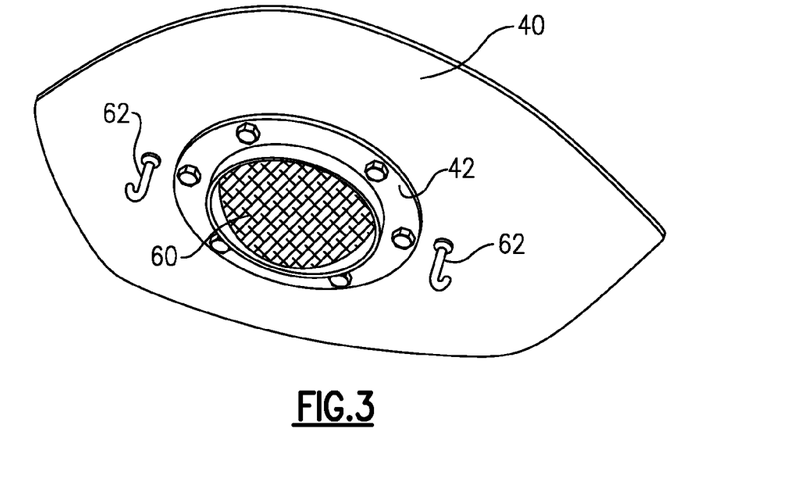
FIG. 3 is a perspective view of a motor plate thereof, showing a filter holder ring and deflagration screen.

Details of the under side of the motor plate 40 are shown in FIG. 3. Here the filter holder 42 is shown bolted around the center of the motor plate 40, and in this case the filter holder 42 also serves to hold down an anti-deflagration screen 60. The screen 60 protrudes down into the core of the filter cartridge, and all of the air stream that leaves the filter chamber 38 has to pass through the anti-deflagration screen 60. This ensures that any flame front that might occur from a sudden ignition of dust in the air stream will be stopped at this point before the air stream is drawn through the blower vac and exhausted to the ambient. Also shown here are a pair of hook members 62, 62 that are affixed to the underside of the motor plate 40 at points diametrically opposite one another around the filter holder 42.

Figure 4:
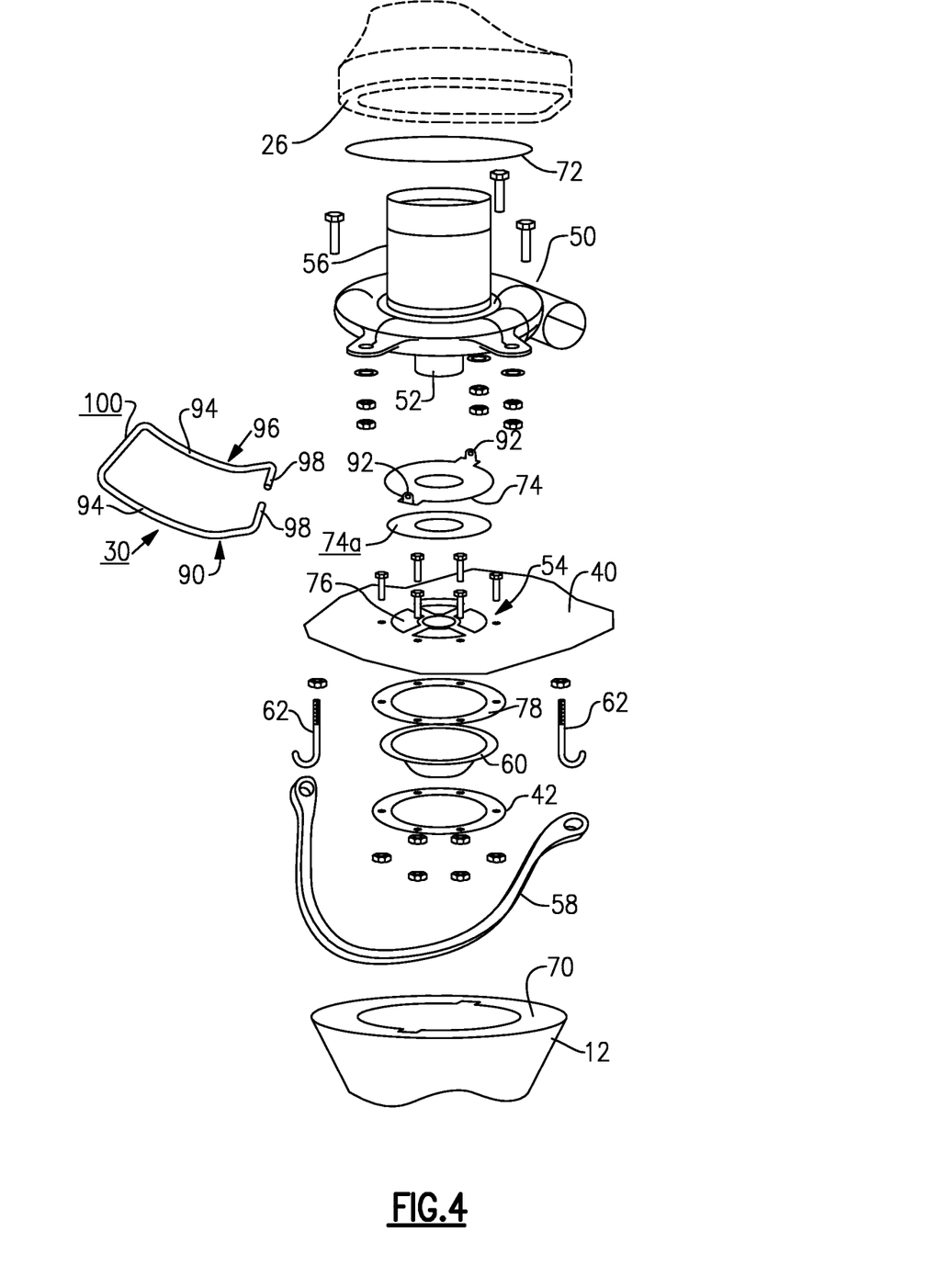
FIG. 4 is an assembly view thereof featuring a reverse air pulse filter cleaning mechanism according to this embodiment of the invention.

FIG. 4 is an assembly view or exploded view showing the construction of the components that are supported on the underside of the motor plate 40 within the filter chamber 38, and those which are supported on top of the motor plate 40 within the motor compartment 26. The filter mount 42, anti-deflagration screen 60, filter strap 58 and hook members 62 have been described earlier. A number of bolts, nuts, washers and other small members are shown, but not described in detail. The blower vac 50 and shroud have been described earlier as well.

A ring flange 70 is welded in place along the inner edge or rim at the top of the conic body 12. The motor plate 40 is seated here against this flange 70, with a gasket (not shown) positioned between them. The motor plate 40 is removably secured here using clamps (not shown).

A cowling screen 72 or foam member is positioned within the shroud, and serves as a noise absorber or sound deadener.

A pulse plate 74, here in the form of an annular plate or open-center disk, is employed for reverse-pulse air-blast cleaning of the filter 44. The plate 74 encircles the intake conduit 52 of the blower vac 50, and also surrounds the central opening 54 of the motor plate. There is an annular opening 76 in the motor plate surrounding the central opening 54; the annular opening being formed of a number of penetrations encircling the central opening. The plate 74, which includes a pulse plate gasket 74a secured to its underside, rests on this annular opening 76, and is normally held sealed against it by the vacuum present in the core of the filter 44. The pulsing handle 30 enters the shroud through a pair of openings, and is attached to the pulse plate 74 at two upstanding ears. The pulsing handle 30 is in the form of a bail, that is two generally parallel lever arm portions that extend from ends of a transverse handle portion, with inwardly directed finger portions that fit into the respective ears. This construction allows an operator to lift the plate 74 by pushing down on the pulsing handle 30 to allow ambient air from the motor compartment to pass down through the annular opening 76 into the core 48 of the filter, with the sudden burst of air creating an outward pulse to blast accumulated dust from the filter media 46. When that occurs, the dust falls down to the separator plate 34, which is somewhat cone shaped in this embodiment, and the dust then proceeds downward through the vortex tube and through the nose of the conic body into the dust collection drum. As soon as the operator releases the lever, the vacuum within the filter chamber pulls the annular pulse plate 74 back into place, so that normal vacuum cleaning and dust separation can continue.

As also shown in FIG. 4, a gasket 78 is provided to form a seal between the outer circumferential edge of the anti-deflagration screen 60 and the under side of the motor plate 40. These are secured in place by the bolt flange of the filter holder 42, which is secured by bolts, nuts and washers.

Figure 5:
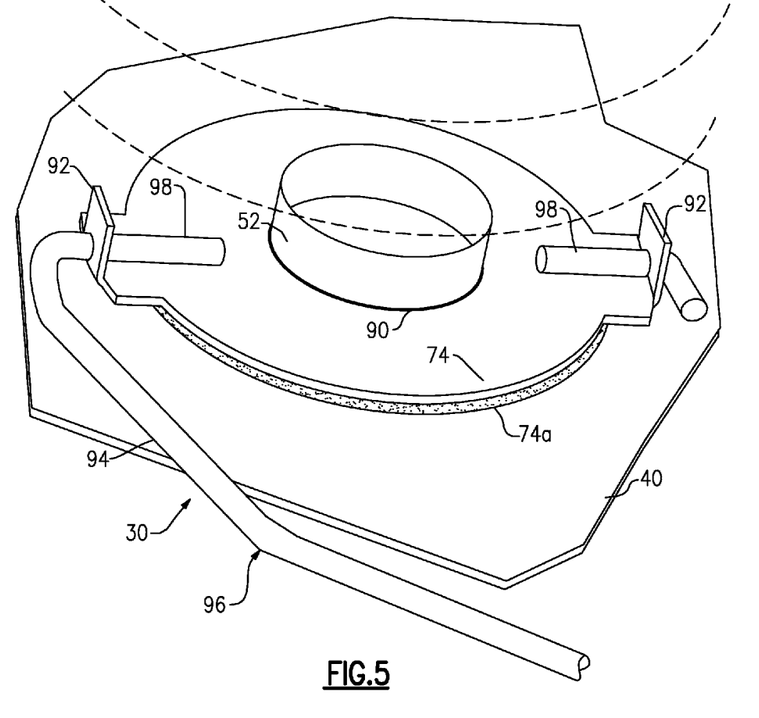
FIG. 5 is a partial perspective view of the pulse cleaning ring and lever, shown mounted on the motor plate about the intake duct of the vacuum blower.

FIG. 5 shows some detail concerning the pulsing lever or handle 30 and pulse plate 74. The pulse plate 74 has a round center opening 90 that fits around the intake duct 52 of the blower vac, and this serves to keep the pulse plate 74 aligned over the associated annular opening(s) in the motor plate 40. There are perforated upstanding ears 92 formed in the pulse plate at diametrically opposed locations. As shown here and in FIG. 4, the pulsing handle 30 of this embodiment has a pair of parallel arms 94 that extend out to a transverse handle portion 100. Each arm 94 has a bend or elbow 96 that rests on the motor plate 40 and serves as a fulcrum so that downward motion on the transverse handle portion 100 will raise the pulse plate 74. At the proximal or pulse-late end of each arm 94 is an inwardly-directed finger 98 that penetrates an associated opening in the respective one of the two upstanding ears 92.

In this embodiment, the pulse plate 74 and pulsing handle 30 are formed of steel, but in other embodiments another metal or a durable plastic resin could be employed.

Figure 6:
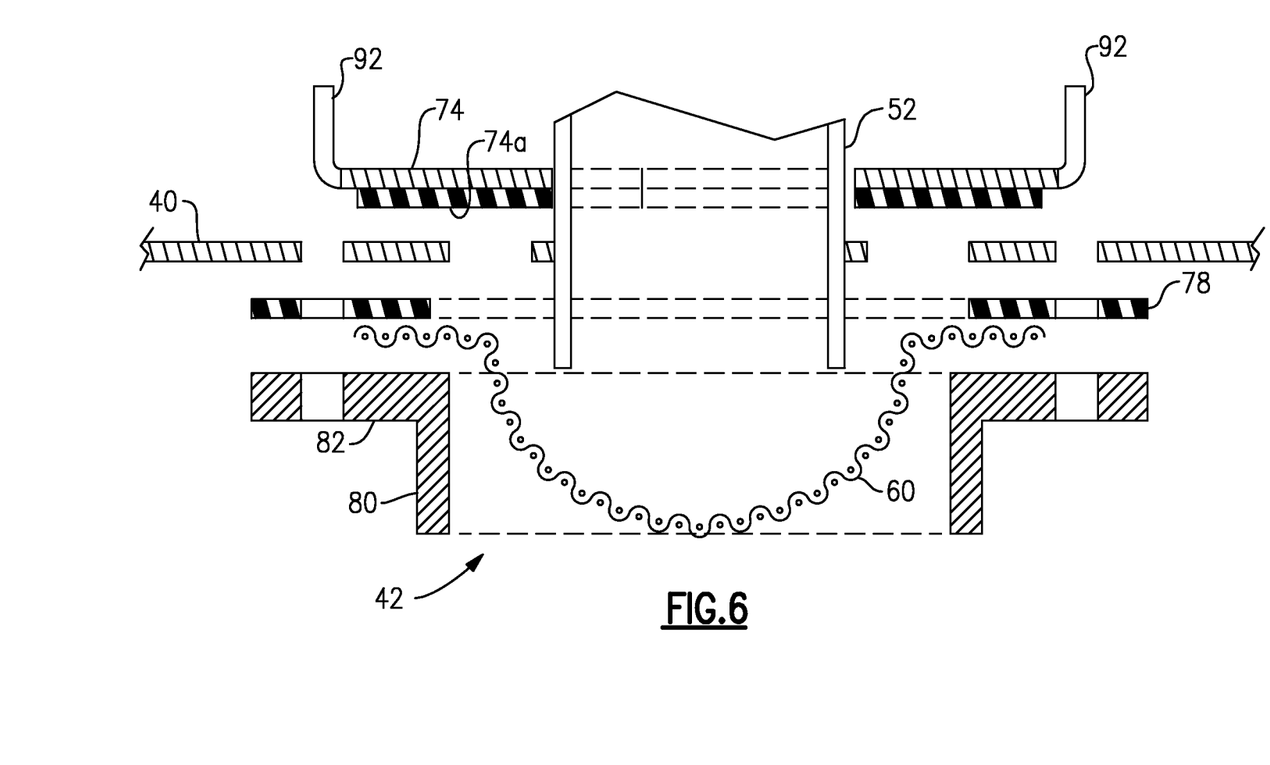
FIG. 6 is a cross sectional view of the filter holder ring, deflagration screen, motor plate and pulse cleaning ring of this embodiment.

As shown in FIG. 6, the anti-deflagration screen 60 is favorably formed as a generally hemispherical dome that protrudes down into the inside of the filter holder 42. The anti-deflagration screen is a metal mesh and quenches any flame front that encounters it to extinguish a deflagration before passing beyond, to the motor vac and the exterior environment. The hemispherical shape creates twice as much surface area as a flat disk, which results in less resistance to air flow. In some cases, a different domed shape could be employed for the anti-deflagration screen such as a screen of conic or frustoconic shape.

As also shown here, the filter holder 42 has a male cylindrical or tubular member 80 and a flat or planar bolt ring 82, the latter being used to secure the circumferential edge of the screen 60 and the associated gasket 78 against the bottom of the motor plate.

In operation, a stream of air that is picked up by the vacuum tool, with entrained dust particles, travels through the intake vacuum hose 14 and enters through the intake pipe 16 into the cyclonic chamber 32, i.e., the cyclonic separator portion of the unit. The air stream then proceeds around the vortex tube 36 and continues on a downward spiral path towards the lower nose of the cyclone. The dust separates against the side of the cyclone chamber and descends down, out the lower nose and into the dust collection drum 22. The air stream, from which the large majority of dust has been separated, then proceeds up the center of the cyclone, and out the vortex tube 36, through the separator plate 34, and into the filter chamber 38. The air moves up around the outer periphery of the filter cartridge 44 and then passes radially inward through the filter media, then passed up through the central opening 54 of the motor plate, and into the intake conduit 52 of the blower vac or centrifugal pump. The air exhausts out an exhaust port of the pump, diffuses around the interior of the shroud, and passes out through openings provided in the upper part of the shroud, back to the ambient. The air exhausted from the unit into the ambient is clean, filtered air, with over 99.97 percent of the dust (down to 0.3 microns) separated from the air stream, where the filter is HEPA rated.

The operator can use this vacuum cleaner for an extended period of time, and does not need to interrupt the operation for the purpose of unclogging or emptying bags or filters. There is improved fire safety as combustible dust particles are entirely filtered out and contained, and are kept from the ambient air. In addition, any spark or deflagration that may be generated by the dust-producing tool, if it should happen to travel through the vacuum hose 14 into the system, will be halted at the deflagration screen 60 before it can exit into the ambient and (potentially) cause an explosion.

The filter service interval for filter 60 is also very long, and pressure loss through the filter cartridges is kept low, due to the efficiency of the pre-separation within the cyclone chamber. The filtration of air and separation of dust vastly improves the industrial hygiene for the operator.

The filter cleaning mechanism, which comprises the lever 30, with its transverse handle portion 100 positioned externally of the shroud 26, together with the pulse plate 74 functions to blow accumulated dust off the filter media.

After some period of operation, when the operator desires to blast the dust from the cylinder, the operator raises the gate valve 84 to close off the intake pipe 16 of the vacuum cleaner. Alternatively the operator can remove the hose 14 from the intake pipe 16 and block that with his or her hand. Then the operator can push down once or twice on the handle 30. This action raises the annular pulse plate 74 off its seat to open the annular opening 76. The pulsing operation allows the higher-pressure air above the motor plate 22 to flood into the space within the open core of the filter cartridge 44, producing a pulse of air in the reverse direction, i.e., from inside to outside of the filter media. This blasts off any dust particles that have accumulated on the outside surface of the filter media. The particles fall down, onto the separator plate 34, and because of the conic shape of the separator plate, the particles follow the slope down to the vortex tube 36 and fall from there, through the cyclonic chamber, and into the dust collection drum. When the lever is released, vacuum brings the pulse plate 74 back onto its seat, and normal vacuum cleaning operations can be resumed.

An alternative arrangement of the filter reverse pulse mechanism are possible, and would not affect the operation of the anti-deflagration screen of this invention.

Within the shroud, the silencer screen may preferably be formed of a porous foam material so that the leaving exhaust air will exit easily.

An alternative arrangement of the portable cyclonic vacuum cleaner could employ a wall mounting plate for attaching to a vertical wall surface, rather than being set up to roll about on wheels or casters.

Also, while the preferred embodiment has the cyclonic chamber and filter chamber formed more-or-less unitarily within a single conic body, the principles of this invention could easily be practiced in a cyclonic dust collector/vacuum cleaner where the cyclonic chamber and filter chamber are built separate from one another, as is frequently the case.

While the invention has been described hereinabove with reference to a preferred embodiment and variants thereof, it should be apparent that the invention is not limited to such embodiments. Rather, many variations would be apparent to persons of skill in the art without departing from the scope and spirit of this invention, as defined in the appended Claims.

We claim:

1. A portable cyclonic vacuum cleaner comprising
   a cyclonic chamber formed of a conic body including a conic wall, a transverse upper wall closing off an upper end of said conic wall, a narrow nose at a lower end of the conic wall, a vortex tube penetrating said transverse wall and descending into said cyclonic chamber and serving as an outlet conduit for said flow of air from said cyclonic chamber, and an inlet conduit penetrating said conic wall below said transverse wall and adapted to introduce into said cyclonic chamber a flow of air in which dust particles are entrained, said air inlet conduit also being adapted to attach to a vacuum conduit;

a dust collection drum positioned below said nose, having a drum lid closing off a top of the dust collection drum, the drum lid having a dust inlet opening at which the nose of the cyclonic chamber is coupled, so that dust separated from said flow of air in said cyclonic chamber falls into said dust collection drum;

a filter chamber positioned in the flow of air after said cyclonic chamber, and including a housing, an inlet receiving air that exits the vortex tube of the cyclonic chamber; a motor plate that is mounted on said filter chamber housing and having a discharge opening therein; an air filter disposed in said filter housing, and being so disposed in said filter chamber such that the flow of air entering the inlet of the filter chamber passes through the filter media from one side thereof to another side thereof, and thence to the discharge opining in said motor plate;

a vacuum blower supported on said motor plate and having a suction duct positioned on the discharge opening of said motor plate, to create said flow of air into said cyclonic chamber, and then into said filter chamber, through said filter media and out said discharge opening into said vacuum blower suction duct; and said motor plate includes a generally annular opening formed therein surrounding said discharge opening, and further comprising a pulse cleaning disk having a center opening slidably fitted on said suction duct, the disk lying atop said generally annular opening, and normally blocking flow of air therethrough; and a pulse-clean lift lever having an end portion attached to said disk and extending away from said suction duct to a handle portion thereof.

2. The portable cyclonic vacuum cleaner according to claim 1 comprising a shroud mounted over said vacuum blower on said motor plate, and wherein said pulse-clean lever extends out a slot in said shroud to said handle portion thereof.

3. The portable cyclonic vacuum cleaner according to claim 1 wherein said filter includes a cylindrical filter cartridge in which said filter media surrounds an open core thereof.

4. The portable cyclonic vacuum cleaner according to claim 3 comprising means securing the cylindrical filter cartridge sealably against the cover plate of said filter chamber, and surrounding said discharge opening so that said open core is aligned with said suction duct.

5. The portable cyclonic vacuum cleaner according to claim 4 further comprising a filter mount that includes a cylindrical member adapted to fit snugly within one end of the open core of said cartridge filter, and a ring flange at one end of the cylindrical member and mounted onto the cover plate of said filter chamber surrounding said discharge opening and also surrounding said generally annular opening.

6. The portable cyclonic vacuum cleaner according to claim 3 further comprising an elastic strap stretched over said cartridge filter and having ends removably secured to anchor members disposed on said cover plate diametrically opposite one another with respect to said discharge opening.

7. The portable cyclonic vacuum cleaner according to claim 1 wherein said pulse-cleaning disk has a pair of upstanding mounting ears disposed on diametrically opposite sides thereof, and wherein said lever is in the form of a bail having parallel rod portions affixed at ends thereof to respective ones of said mounting ears.

8. The portable cyclonic vacuum cleaner according to claim 1 comprising a flat annular gasket positioned on a lower surface of said pulse-cleaning disk.

9. The portable cyclonic vacuum cleaner according to claim 4, said means securing the cylindrical filter cartridge comprising an elastic strap stretched over said cartridge filter and having ends removably secured to anchor members disposed on said cover plate diametrically opposite one another with respect to said discharge opening.

* * * * *